US005586293A

United States Patent [19]
Baron et al.

[11] Patent Number: 5,586,293
[45] Date of Patent: Dec. 17, 1996

[54] REAL TIME CACHE IMPLEMENTED BY ON-CHIP MEMORY HAVING STANDARD AND CACHE OPERATING MODES

[75] Inventors: Nathan Baron, Oranit; Paul Marino, Kfar Saba; Avner Goren, Ramat-Hasaron; Eyal Melanmed-Cohen, Jerusalem, all of Israel

[73] Assignee: Motorola, Inc., Schaumburg, Ill.

[21] Appl. No.: 372,728

[22] Filed: Jan. 17, 1995

Related U.S. Application Data

[63] Continuation of Ser. No. 912,470, Jul. 13, 1992, abandoned.

[30] Foreign Application Priority Data

Aug. 24, 1991 [GB] United Kingdom ................... 9118312

[51] Int. Cl.$^6$ ...................................... G06F 13/00
[52] U.S. Cl. .................. 395/445; 395/452; 395/462; 395/483; 395/834; 395/842; 395/465
[58] Field of Search ...................... 395/445, 452, 395/462, 471, 483, 493, 726, 834, 842, 843, 848, 465, 466, 472

[56] References Cited

U.S. PATENT DOCUMENTS

| | | | |
|---|---|---|---|
| 3,979,726 | 9/1976 | Lange et al. | 395/462 |
| 4,195,341 | 3/1980 | Joyce et al. | 395/445 |
| 4,513,367 | 4/1985 | Chan et al. | 395/425 |
| 4,580,240 | 4/1986 | Watanabe | 395/425 |
| 4,602,368 | 7/1986 | Circello et al. | 395/425 |
| 4,669,043 | 5/1987 | Kaplinsky | 395/400 |
| 4,788,656 | 11/1988 | Sternberger | 395/275 |
| 4,977,498 | 12/1990 | Rastegar | 395/425 |
| 5,025,366 | 6/1991 | Baror | 395/425 |
| 5,155,833 | 10/1992 | Cullison et al. | 395/425 |
| 5,159,676 | 10/1992 | Wicklund et al. | 395/425 |
| 5,210,849 | 5/1993 | Takahashi et al. | 395/471 |
| 5,226,144 | 7/1993 | Moriwaki et al. | 395/448 |
| 5,228,136 | 7/1993 | Shimizu et al. | 395/448 |
| 5,297,270 | 3/1994 | Olson | 395/425 |
| 5,363,496 | 11/1994 | Kato et al. | 395/462 |

Primary Examiner—Glenn Gossage
Attorney, Agent, or Firm—Robert D. Atkins

[57] ABSTRACT

An integrated circuit chip includes a processor (4) and a memory (10) coupled by data and address buses (PAB, PDB). The memory is switchable between a first, standard, mode of operation in which a memory controller (14) is operative and a second, cache, mode of operation in which a cache controller (12) is operative by a switch (16, 22, 40). A memory area includes a valid bits array (VBA), a bit of which is set when a valid word is stored in a respective memory address of the memory in standard mode. If a valid bit exists corresponding to an address on the address bus, then information loaded into the memory in standard mode can be used by the processor in cache mode. The operating mode of the memory is switched using an operating mode register having a cache enable section, and a cache enable control line coupled to the memory. A reset arrangement is provided for resetting the valid bits array to flush the cache in a single operation. In one preferred embodiment, the cache is an instruction cache and the integrated circuit chip is a digital signal processor (DSP).

11 Claims, 4 Drawing Sheets

REAL TIME CACHE IMPLEMENTED BY ON-CHIP MEMORY HAVING STANDARD AND CACHE OPERATING MODES

This application is a continuation of prior application Ser. No. 07/912,470, filed Jul. 13, 1992, now abandoned.

FIELD OF THE INVENTION

This invention relates to on-chip memory serving the function of a real-time cache.

BACKGROUND ART

The introduction of faster microprocessors and digital signal processors (DSPs), often in multiprocessor systems, has increased the importance of on-chip memories with high hit ratios.

A possible solution implemented in various DSPs and real-time processors is the use of direct memory access (DMA) to load an internal random access memory (RAM), in parallel to current program execution, with program sections to be used in the near future. These schemes could yield 100% hit ratio with deterministic performance. But to use the DMA effectively the programmer (or compiler) should keep track of the physical addresses at all times—a cumbersome task.

A cache can yield similar results transparently. But since caches are based on the statistical characteristics of the code, they can not guarantee deterministic access time, which is a major requirement for time-critical routines in real-time systems. Providing both a DMA and a cache on the same die can solve this contradiction, but would result in inefficient use of silicon area.

SUMMARY OF THE INVENTION

It is an object of the invention to provide an on-chip memory with both DMA and cache functions, with optimum use of silicon area.

The present invention provides an integrated circuit chip including:

a processor and a memory section, coupled via data and address buses, switch means for switching the memory between a first, standard, mode of operation, in which a memory controller is operative and a second, cache, mode of operation, in which a cache controller is operative, and means for enabling the use in cache mode of information loaded into the memory in standard mode.

As preferred, the cache operates as an instruction cache (particularly for DSP applications), but it may function as a data cache or as a unified cache having both instructions and data.

As preferred, the switch means includes a register (the operating mode register) having a cache enable bit which is inspected by the processor to determine the mode of operation.

In accordance with the invention, a user is enabled to use, in CACHE MODE, program sections that were loaded in STANDARD MEMORY MODE via DMA. Thereby the user may pre-load time-critical routines into the cache at the initialization phase, thus providing hit-on-first-access which is critical for interrupt routines. Furthermore, the user can switch back and forth between the two operating modes, preserving data or flushing it when needed. This may enable the user to run different tasks in different operating modes.

In a preferred embodiment, the cache organization may be defined as an eight-way, fully associative, sectored cache with one word transfer granularity. The internal program memory is a 4K byte memory and is logically divided into eight 128-word cache sectors, one word being 4 bytes long. The basic replacement unit is the sector but the basic transfer unit is the single 32-bit word. A 25-bit tag is associated with each cache sector, and a valid bit is associated with each cache word. To determine whether a program access is a cache hit or miss, the tag comparison is done to determine if the sector resides in the cache, and the valid bit is checked by means of a seven bit word displacement address to determine if the specific word resides in the sector. When a word miss occurs only a single word is fetched and the corresponding valid bit is set. When a sector miss occurs, a full 128-word sector is flushed, a new tag value is loaded, but only a single word is fetched. The cache sector mapping is fully associative and the replacement policy is Least Recently Used (LRU).

The sectored cache organization was chosen since it gives good silicon area utilization (the fraction of the total cache area used to store data) since the number of the tags is kept small (only 8) while the valid bits could be organized in a compact 1K bit RAM array. Eight sectors still enable holding, in the cache, eight widely spread routines, each up to 128 words long. Furthermore, the one word transfer unit keeps the bus traffic low since only the necessary instructions are fetched and cache pollution, whereby words which are not needed are brought into the cache, usually when a transfer unit is larger than a single word, is minimized.

The fully associative placement policy was chosen because it gives the best cache utilization. This becomes extremely important when some of the sectors are locked, because the fully associative cache permits placing a new memory sector in any of the remaining unlocked cache sectors. The LRU replacement policy was chosen and the eight element deep stack was implemented using a triangular matrix.

Pre-loading time-critical routines can be done after reset, while still in standard mode, using DMA transfers. Each of these transfers will set the corresponding valid bit, and therefore, when in cache mode an access to that word will yield a hit-on-first-access.

A locking mechanism is provided. Any memory sector could be locked in the cache using a special LOCK instruction that may use any of the addressing modes. When a cache sector is locked the valid words already in that sector are preserved, empty words may still be filled, but the sector can not be replaced. Unlocking a sector could be done using the UNLOCK instruction or the global FREE instruction.

A global FLUSH instruction is provided. This single cycle instruction flushes the whole cache. It can be used to prevent consistency problems when an external device loads new code into the external program memory.

A cache bypass mechanism is also provided by the MOVE to/from program memory instructions. These instructions are not cacheable and are therefore useful for accessing shared data tables stored in the program memory, and for self modifying programs. To maintain cache consistency at all times, these MOVE instructions, when writing into a cache location, will simultaneously write into the corresponding external program memory location.

Thus in a preferred embodiment, the chip architecture includes three blocks: RAM array, DMA controller and CACHE controller. The cache controller is composed of the following sub-blocks:

Tag Register File (TRF): one tag for each memory sector.

Valid Bits Array (VBA): one valid bit for each memory word.

Sector Replacement Unit (SRU)

After reset the nags are set to default values corresponding to the RAM mapping in the address space. The valid bits are all cleared.

When in STANDARD MEMORY MODE, the internal RAM address space is fixed and therefore the tag values are changed. Since the internal RAM initially contains no-valid data, all the valid bits are cleared. Any write into the internal RAM (via DMA or MOVE instruction) will set the valid bit corresponding to that RAM word.

Asserting the CACHE ENABLE bit in the Operating Mode Register will switch the operating mode from STANDARD MEMORY MODE to CACHE MODE. This switch of mode will not change the values stored in the Tag Register File or Valid Bits Array.

During the CACHE MODE the mapping of the internal RAM is not fixed and therefore the tag values may change to reflect the current mapping.

Time-critical routines, pre-loaded via DMA when still in STANDARD MEMORY MODE, will have their valid bits set and will therefore be accessed with hit in CACHE MODE. Via the LOCK instruction these routines could be locked to prevent their removal from the cache.

Disasserting the CACHE ENABLE bit in the Operating Mode Register will switch the operating mode from CACHE MODE to STANDARD MEMORY MODE.

BRIEF DESCRIPTION OF THE DRAWINGS

A preferred embodiment of the invention will now be described with reference to the accompanying drawings, in which.

DESCRIPTION OF THE PREFERRED EMBODIMENT

Figure 4:
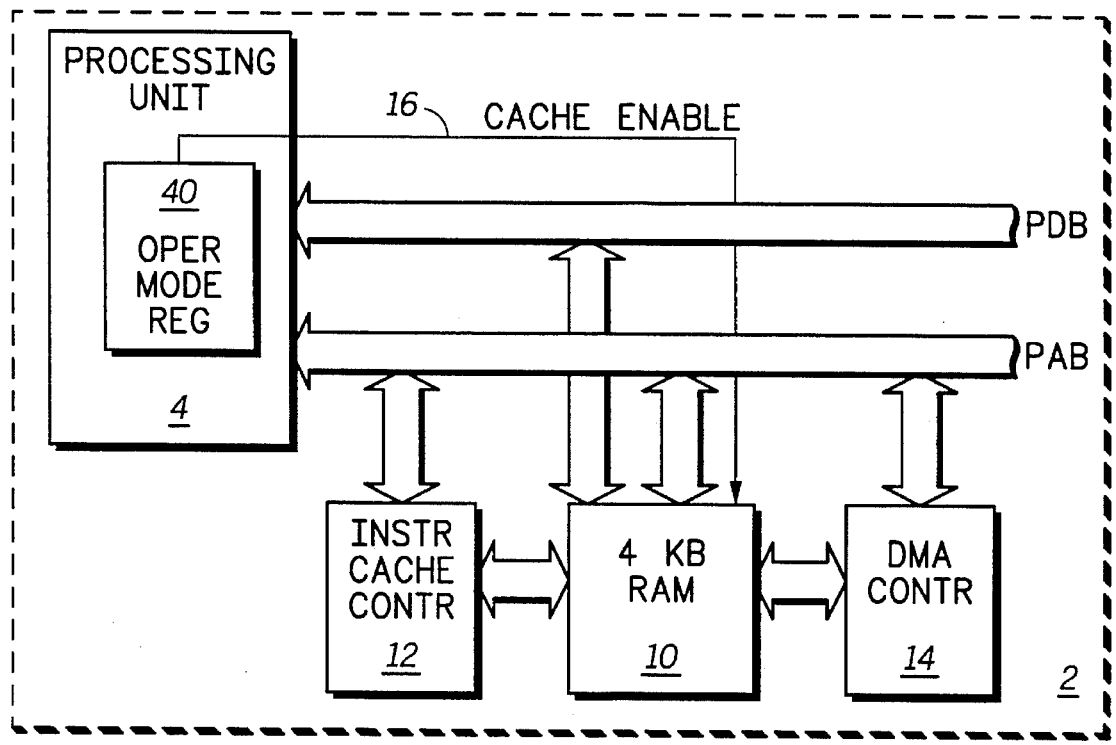
FIG. 4 is a generalized block diagram of the architecture of the integrated circuit chip according to the invention.

Referring now to FIG. 4, the chip 2 includes a processing unit 4, 32 bit wide address and data buses program address bus (PAB), program data bus (PDB), a 4k byte RAM memory 10, an instruction cache controller 12 and a direct memory access DMA controller 14. Other units will in practice be provided, and conveniently the chip will comprise a DSP processor, such as the Motorola DSP16002 chip. The processing unit 4 includes an operating mode register 40 having cache enable control line 16 coupled to switch 22.

The memory 10 may be employed as standard memory with fixed addressing that may be accessed both by processing unit 4 during execution of fetch and move instructions and by DMA controller 14 so that information may be transferred from an external memory on bus 8. In accordance with the invention, the memory 10 may also be used as a cache in which case the DMA controller 14 is disabled and all access to memory 10 will be controlled by the instruction cache controller 12.

An instruction cache may be viewed as a buffer memory between the main memory, and a fast processor. The cache is used to store program instructions that are frequently used. An increase in throughput may result when instruction words required by a program are available in the on-chip cache, and the time required to access them on the external bus is eliminated.

Figure 1:
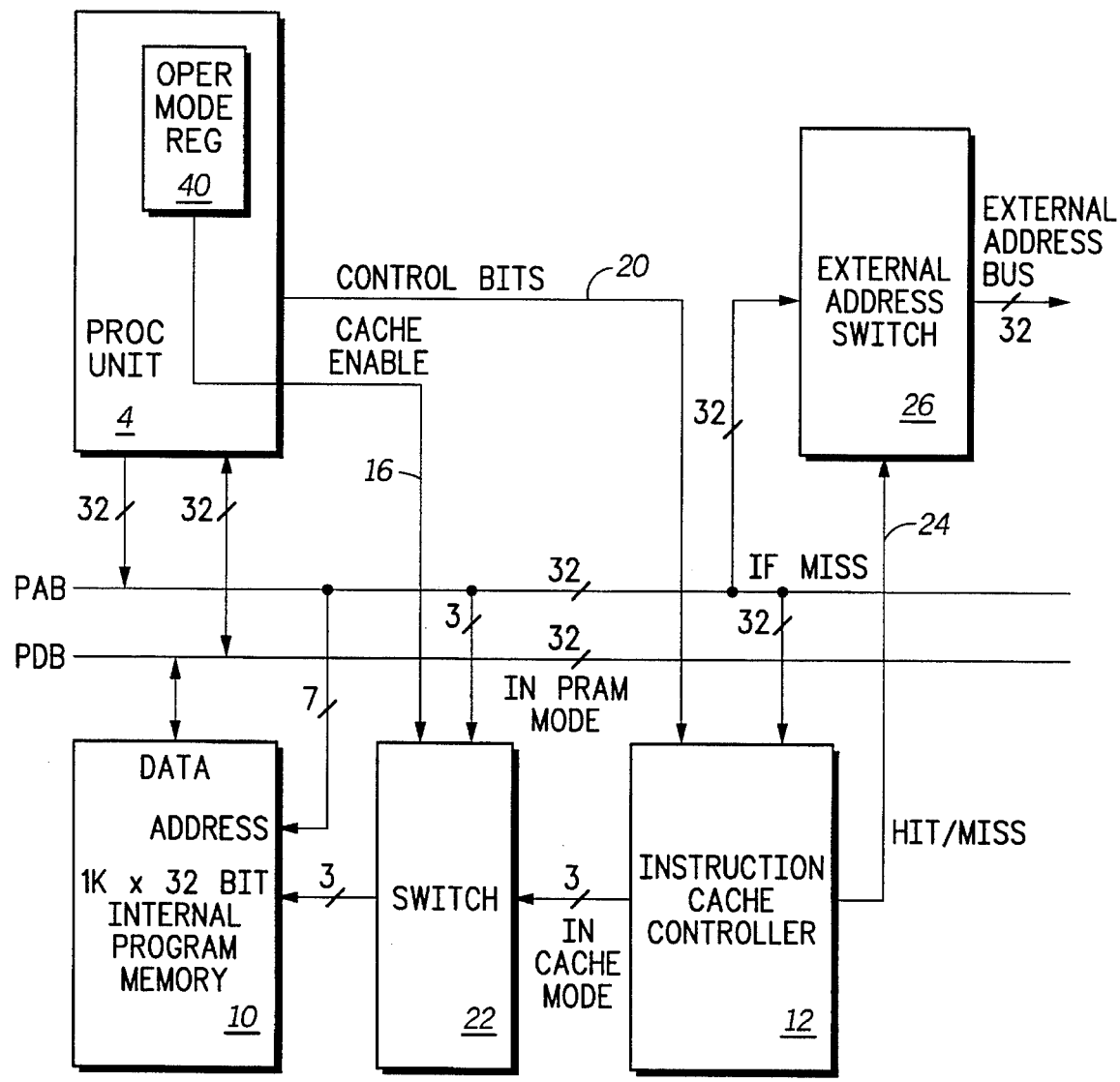
FIG. 1 is a block diagram of a chip, including an instruction cache.

FIG. 1 shows a block diagram of a chip including an instruction cache. Like parts to those shown in FIG. 4 are indicated by the same reference numeral. As shown in FIG. 1, processing unit 4 is implemented as a DSP processing unit. The operating mode register 40 determines the mode of operation of the chip and 1 bit of the register is termed a CACHE ENABLE (CE) bit. This CE bit is provided on the cache enable control line 16 to switch 22 which switches address control of the memory 10 between bus PAB and controller 12 to enter standard or cache mode. In addition controller 12 has a "hit/miss" control line 24 which is coupled to an external address switch 26 which permits an external memory to be accessed on the PAB should a miss occur in the cache memory.

Thus in operation, in cache mode, the DSP Core initiates an instruction fetch on the PAB (Program Address Bus). The Instruction Cache Controller determines if the addressed instruction appears in the Internal Program Memory (the "cache array").

If it does, a "hit" is signalled, the external fetch is disabled in the External Address Switch 26 and the internal Program Random Access Memory (PRAM) is addressed from the cache controller 12 as sector number (3 MSBs) and sector offset (7 LSBs).

If the addressed instruction does not appear in the Internal Program RAM, a "miss" is signalled and the external fetch cycle is initialized. When the corresponding instruction appears on the PDB (Program Data Bus) in the following cycle it is latched in parallel into the Internal Program RAM 10.

If the CE bit is not set, the processor reverts to standard "PRAM" mode in which fetches are made internally or externally, depending on the address value.

Figure 2:
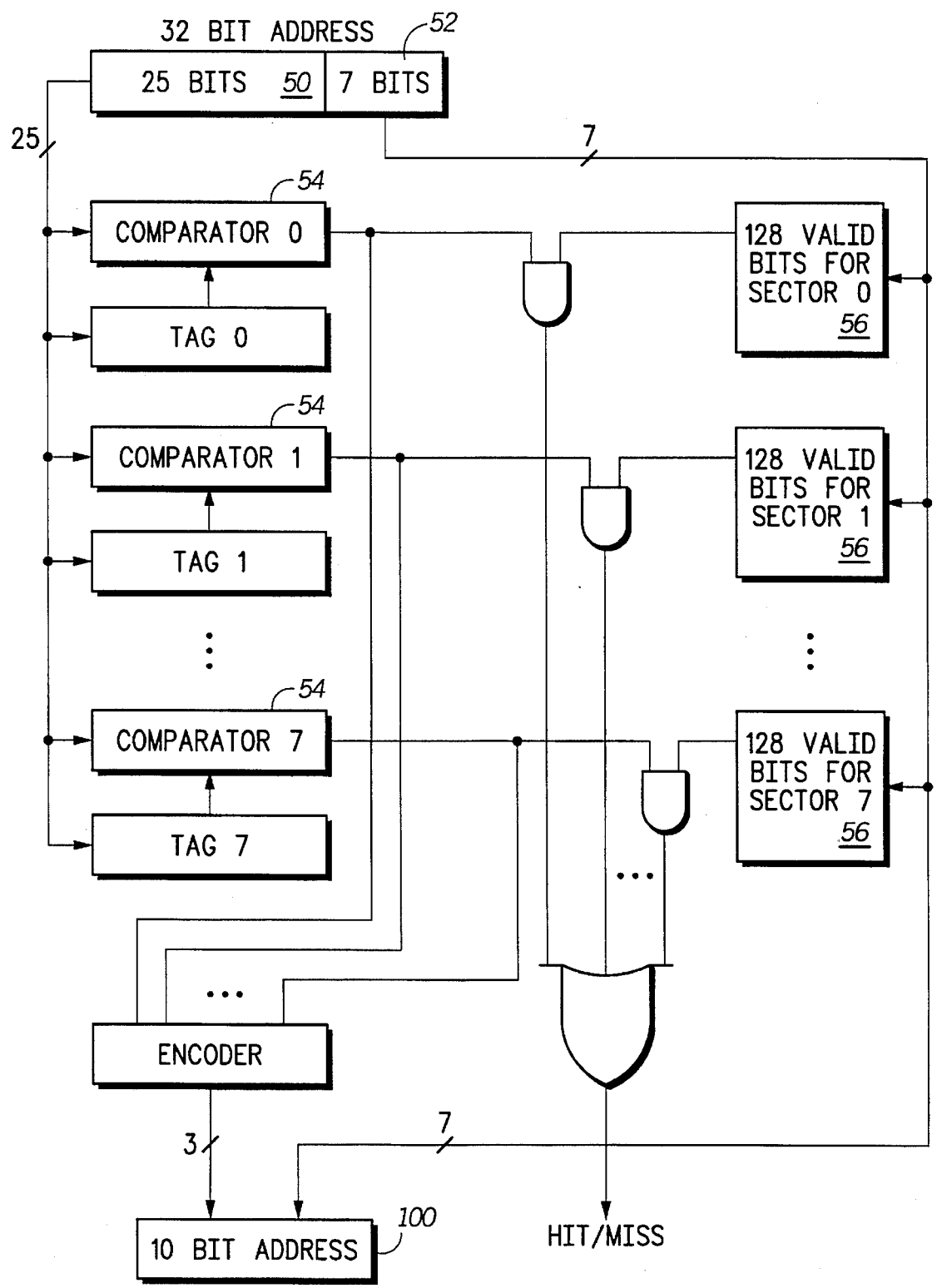
FIG. 2 is a diagram illustrating an instruction cache controller of the chip of FIG. 1.

Referring now to FIG. 2, an example of an instruction cache controller is shown.

The Internal Program RAM 10 contains 1024 32-bit words, logically divided into eight 128-word sectors. The term "sector" is used, rather than "block", since a sectored-cache distinguishes between "sectors" which are the basic replacement units, and "blocks" which are the basic transfer units. In this case a "block" is a 32 bit word so that one can use the terms "block" and "word" interchangeably.

Since there are 8 sectors of 128 words each, in the internal program RAM, the 32 bit address is divided into the following two fields:

7 LSBs for the word displacement or offset in the sector as at 52.

25 MSBs for the tag as at 50.

The sectors placement algorithm is fully associative, i.e. each external program memory sector could be placed in any of the 8 internal program RAM sectors. Therefore one can state that this is an 8 way fully associative cache.

A 25 bit tag is associated with every one of the 8 internal program memory RAM sectors. When the Cache Controller 12 searches for a tag equal to the tag field of the current address, it compares it to the 8 tags in parallel using 8 comparators 54. The comparators are implemented as XORs which are part of the tag registers.

Each word in each cache sector is associated with a cache word valid bit 56, that specifies whether or not the data in that word has already been fetched from external memory and is therefore valid. There is a total of 1024 valid bits, arranged as 8 banks of 128 valid bits each, one bank for every sector. Note that these valid bits are not available to the user, for direct use. The valid bits are cleared by the processor RESET to indicate that the PRAM content has not been initialized.

Figure 3:
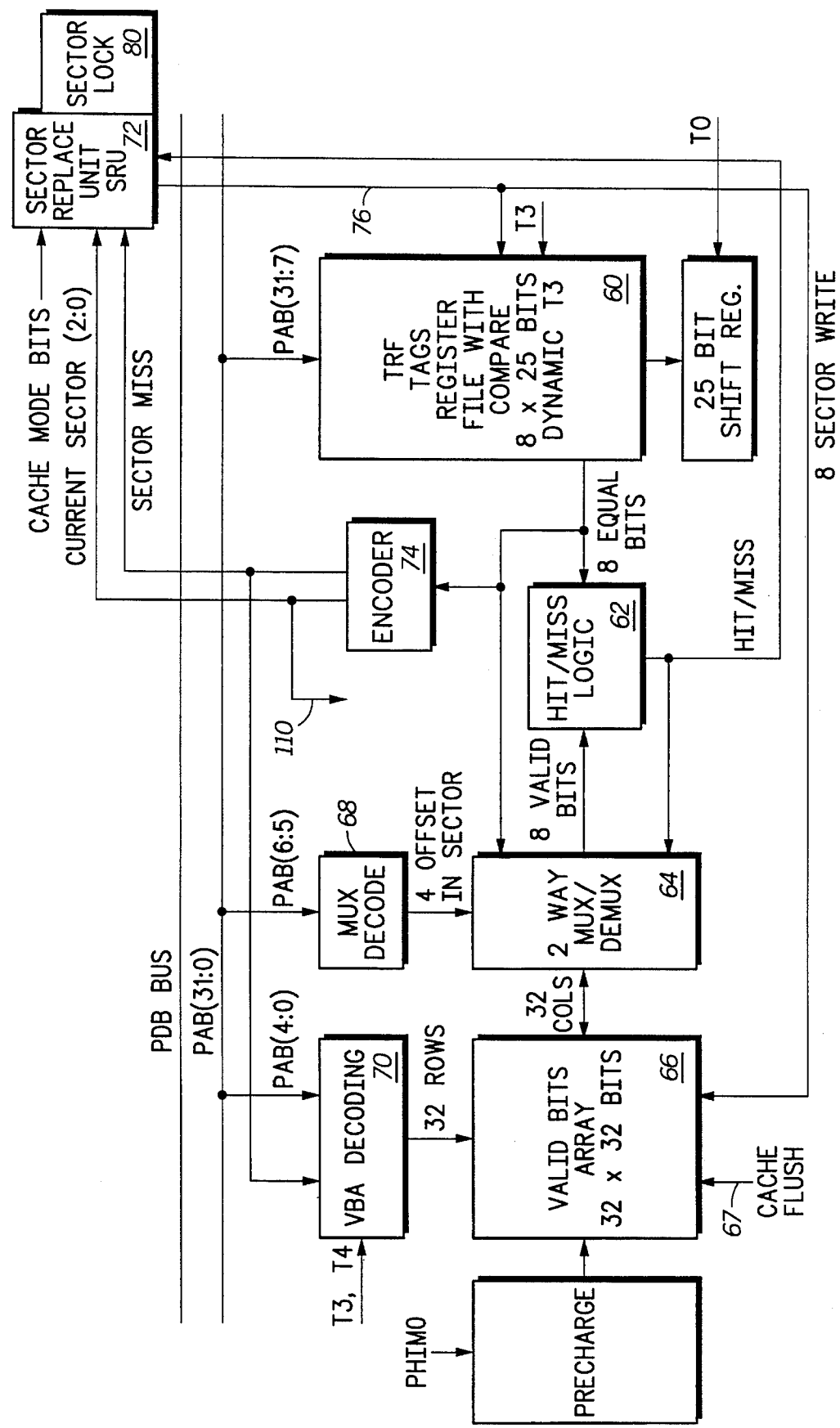
FIG. 3 is a more detailed block diagram of the instruction cache controller shown in FIG. 2.

Referring now to FIG. 3 there is shown in more detail the instruction cache controller as comprising a tag register file (TRF) 60 for comparing the tags associated with the memory sectors with the address on the PAB. It will be appreciated that a description of signals T0, T3, T4 and PHIMO is not required for the purpose of describing the specific embodiment of the invention as shown in FIG. 3. The result of the comparison by the tag register file 60 is fed to hit/miss logic 62 and to a two-way multiplexer/demultiplexer 64 which permits access in terms of reading or writing to a valid bit array 66 comprising 32×32 bits. A CACHE FLUSH reset line 67 is coupled to array 66 for resetting the array in a single operation.

The PAB is coupled to multiplexer/demultiplexer 64 by a multiplexer (MUX) decode unit 68 and is coupled to valid bit array (VBA) 66 by a VBA decoding circuit 70. A sector replace unit 72 is provided which is coupled to TRF 60 via an encoder unit 74 and also has a write line 76 coupled to TRF 60 and valid bits array 66. Sector replace unit 72 includes (not shown) a stack in which sector addresses are organized according to a least recently used (LRU) algorithm with the least used at the bottom of the stack. Sector lock mechanism 80 associates a lock bit with each locked sector in the stack so that it cannot be replaced.

Referring to FIGS. 2 and 3, there follows a description of cache operation in various situations.

Each instruction is fetched on demand, i.e. only when needed. When the processor needs an instruction, the physical address of that instruction is sent to the instruction cache controller 12 via the PAB (see FIG. 1). The cache controller compares part of the address, specifically the tag field to the tags it currently stores in TRF 60.

If there is a tag match (i.e. sector hit), then the valid bit of the corresponding word in that sector is checked as determined at 64, 66 and 70. If the valid bit is set, meaning the word in the cache has already been brought to the cache and is valid, then that word is fetched from the cache location corresponding to the desired address. This situation is called a cache hit meaning that both corresponding sector and corresponding instruction word are present and valid in the instruction cache. The sector replacement unit (SRU) 72 updates the used sector state according to the LRU algorithm.

If there is a tag match, i.e. sector hit, but the desired word is not valid in the cache (corresponding valid bit=0, i.e. a word miss), then the cache initiates a read cycle from the external program memory onto the PDB. The fetched instruction is sent both to the processor and copied to the relevant word location of the instruction cache. Then the valid bit of that word is set. All this is done in parallel with normal execution and does not require any additional clock or memory cycles (such as wait states). The SRU updates the used sector state according to the LRU algorithm.

If there is no match between the tag field and all sector tag registers, meaning that the memory sector containing the requested word is not present in the cache as determined at 62, this situation is called a sector miss, which is another form of a cache miss. If a sector miss occurred, the cache's SRU 72 selects the sector to be replaced. The cache then flushes the selected sector by resetting all corresponding valid bits, loads the corresponding tag with the new tag field, and at the same time initiates an external instruction read cycle from the physical address requested by the core. When the data arrives from external memory, the processor loads it on the PDB, the cache copies it to the word location specified by the 7 LSBs of the address in the sector and sets the corresponding valid bit. The sector replacement control unit is now updated by the SRU. The SRU unit is updated after each fetch because it implements the "least recently used algorithm." On each fetch, the SRU checks which sector was accessed and rearranges the sector numbers in the stack so that the most recently used sector will be in the top of stack and the least recently used sector number will be in the bottom of the stack.

The seven least significant bits (52) of the 32 bit address are concatenated with the three bit output 110 from the current sector (2:0) line, to provide a ten bit address output 100 for the Program RAM. The instruction cache of the invention is a "real-time" cache. Therefore it should have no inherent penalty on a cache miss. In other words, if there is a cache hit, it would take exactly one bus cycle to fetch the instruction from the on-chip cache—like fetching any other data from an on-chip memory. If there is a cache miss, it would behave exactly as a "normal" instruction fetch, like fetching any other data from an external memory.

Furthermore, a "real-time" instruction cache allows the user to declare some code areas as time critical and therefore "non-replaceable". Four instructions are added to the instruction set, to permit the user to lock sectors of the cache, and to flush the cache contents under software control.

Figure 5:
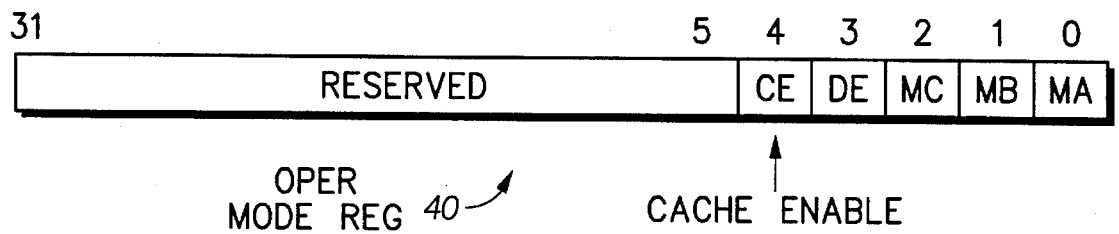
FIG. 5 is diagram illustrating the details of the Operating Mode Register of FIG. 4.

Referring to FIG. 5, Operating Mode Register 40 is shown. The register 40 has chip operating mode bits MA, MB and MC (bits 0 to 2), which denote the operating mode of the chip and determine which mode (A, B or C) the startup procedure will take and also determine whether the PRAM is enabled or disabled, a data ROM enable bit DE (bit 3), which enables or disables the internal data ROM, the cache enable bit CE (bit 4), as well as a number of reserved bits 5–31, which have no defined function. Bit number 4 is the CACHE ENABLE bit which determines the mode of operation of the cache. Bit number 4 selects between the cache mode of operation and the standard mode of operation.

Cache Operating Modes

Cache operating mode categories and individual sector modes are described in the following sections.

Basically there are two main modes: CACHE MODE and STANDARD (hereinafter termed PRAM) MODE. These modes are both global, i.e. they effect the internal program memory as a whole. When in CACHE MODE, each separate sector could be in one of two operating modes: SECTOR UNLOCKED MODE or SECTOR LOCKED MODE. When in PRAM MODE the PRAM as a whole could be in one of two modes: PRAM ENABLED or PRAM DISABLED. Both in CACHE MODE and PRAM MODE, the whole cache could be flushed by a software instruction.

The operating modes may be summarized in the following table:

CACHE MODE (global):
    Sector Unlocked Mode (per sector)
    Sector Locked Mode (per sector)
    Cache flush (global)

PRAM MODE (global):
  PRAM Enabled (global)
  PRAM Disabled (global)
  Cache flush (global)

Cache Mode

In the Cache mode, accesses to the storage area of the sectors are done implicitly by instruction fetches or by specific instructions which perform a move from a register to program memory or from program memory to a register. DMA reference to/from program memory space (in the cache or external) will be disabled in hardware.

Sector-Unlocked Mode

When in Sector-Unlocked mode, the program memory sector is configured as a regular cache sector. Sector replacement from that cache sector is allowed. The cache controller will decide when to replace an external memory sector that resides in a certain cache sector (sector miss), according to the cache controller LRU algorithm.

Unlocking a sector could happen in four different situations. In the first situation the user unlocks a specific cache sector by using a PUNLOCK instruction. In the second situation the user unlocks all the cache sectors in the internal program memory by using a PFREE instruction. In the third situation the user unlocks all the cache sectors in the internal program memory as part of a cache flush by using a PFLUSH instruction. In the fourth situation a hardware reset unlocks all the cache sectors.

A locked sector can be unlocked by a special instruction called PUNLOCK. Its operand is an effective memory address. The memory sector containing this address is allocated into a cache sector (if it is not already in a cache sector) and this cache sector is unlocked. As a by-product of this sequence, the unlocked cache sector is placed at the top of the LRU stack (i.e. most recently used).

Unlocking a locked cache sector via PUNLOCK, will not affect its contents, its tag, or its valid bits. If the specified effective address does not belong to one of the current cache sectors, a memory sector containing this address will be allocated into the cache, thereby flushing the least recently used cache sector. The unlocked cache sector will be placed at the top of the LRU stack and it will be enabled for replacement by the LRU algorithm.

All the locked sectors can be unlocked simultaneously using the instruction PFREE. This instruction provides the user with a software reset of the locking mechanism. Unlocking the sectors, via PFREE, does not affect their contents (instructions already fetched into the sector storage area), their valid bits, their tag register contents or the LRU stack status.

The locked sectors could also be unlocked by the PFLUSH instruction as part of a total cache flush. Unlocking the sectors, via PFLUSH, clears all the sector's valid bits and sets the LRU stack and tag registers to their default values.

Sector Locked Mode

This mode is useful for latching some time-critical code parts in the cache memory. The SECTOR LOCKED mode is set by the user to lock the memory sector that currently resides in the cache sector. When a cache sector is in SECTOR LOCKED mode, the Sector Replacement Unit (SRU) dan not replace this sector even if it is the least recently used sector (bottom of LRU stack).

Fetching new instructions from addresses contained in the current memory sector is allowed in this mode and it will update the storage area (during a word miss), or it will be read directly from the sector area (during a cache hit). On the other hand, replacement of the current sector by the SRU is disabled. When a sector is locked, its LRU status continues to be updated, but when choosing the cache sector to be replaced, this sector is ignored and will not be designated as a destination for the new memory sector.

A sector can be locked by the instruction called PLOCK. Its operand is an effective memory address. The cache sector, to which this address belongs (if there is such one), is locked. If the specified effective address does not belong to one of the current cache sectors, a memory sector containing this address will be allocated into the cache, thereby replacing the least recently used cache sector. This cache sector will be locked but empty. As a by-product of this sequence, the locked cache sector is placed at the top of the LRU stack (i.e. most recently used).

Locking a sector does not affect the contents of the cache sector (instructions already fetched into the cache sector storage area), the valid bits or the tag register contents of that particular sector.

Pram Mode

In the PRAM MODE the Internal Program RAM 10 will be either ENABLED or DISABLED according to the OMR register 40. DMA references to/from Program Memory will be enabled and so would be the MOVEM instruction.

Nevertheless, when writing a word into the internal PRAM in PRAM mode, the corresponding valid bit will be set, so that when the user switches into CACHE MODE he will know that this word has been initialized and is therefore valid.

The tag registers are not updated in any way when in PRAM mode. Likewise the Sector Replacement Unit is not updated in this mode. The valid bits are not tested and the HIT/MISS~ signal is ignored.

The PFLUSH and PFREE instructions can be issued when in PRAM MODE.

Cache Use Scenario

In this section, a possible scenario of cache use in a real time system is demonstrated.

1. The chip exits the hardware RESET in PRAM MODE as determined by the mode bits.

2. To achieve "hit on first access" (especially important for the fast interrupt vectors), the user, while still in PRAM MODE and using DMA, transfers the interrupt vectors and some critical routines into the lower PRAM addresses. These DMA transfers set the corresponding valid bits. Lets presume that the code uses 200 PRAM words and therefore it will be contained in 2 cache sectors. Since these routines are time critical the user will wish to lock these sectors. A possible code may look like this:

| LABEL | ADDRESS | CODE |
|---|---|---|
|  | $00000000 | reset vector |
|  | ... |  |
|  | $0000003e | host b write p memory vector |
| user_code | $00000040 | user critical routines |
|  | ... |  |
|  | $0000007f | end of sector 1 |

| LABEL | ADDRESS | CODE |
|---|---|---|
| | $00000080 | beginning of sector 2 |
| | ... | |
| | $000000c8 | end of user critical routines |

3. To enter CACHE MODE the user sets OMR bit4. To lock address 0 to 200 in the cache the user issues the PLOCK instruction twice, each time with an effective address that belongs to the corresponding memory sector. Please notice that 3 cycles should separate the change off OMR bit4 from the PLOCK instruction.

The code may look like this:

| | |
|---|---|
| ORI #$10, OMR | : set CE bit in OMR |
| NOP | : pipeline delay |
| NOP | : pipeline delay |
| NOP | : pipeline delay |
| PLOCK #0 | : lock sector containing address 0 |
| MOVE #128, R0 | : load effective address to r0 |
| NOP | : pipeline delay for move |
| PLOCK R0 | : lock sector containing address 128 |

Notice that this code doesn't lie within the critical sectors but rather in the initialization code. PLOCK is the first instruction fetched in CACHE MODE.

4. Now the cache is ready for normal operation with 2 sectors locked and 6 sectors in unlocked mode. Notice that a fetch from one of the locked sectors (addresses 0 to 200) will not cause a miss since the code for these sectors was brought into the cache while in PRAM MODE.

5. The user can lock an additional sector dynamically. The sequence is similar to that showed in the previous paragraph. But a dynamically locked cache sector will not necessarily contain the valid date and would therefore be filled by word misses each time a new word is fetched.

6. It would be wise to place time critical routines on sector boundaries. This would give optimal cache sector utilization. The compiler could certainly obey this constrain.

7. To unlock the cache sector containing addresses 127 to 255 for example, all the user has to do is:

| | |
|---|---|
| MOVE #140, R0 | : load effective address to r0 |
| NOP | : pipeline delay |
| PUNLOCK R0 | : unlock sector containing address 128 |

Notice that address 140 was used as an example since it belongs to the range 128 to 255.

8. To unlock all the locked cache sectors the code will be:

PFREE

This instruction is useful in the case where the user forgot which sectors or addresses were previously locked, or as a software reset to the locking mechanism.

9. To execute the bootstrap program the user switches to PRAM MODE, executives the 3 NOPs needed for pipeline delay, performs a PFLUSH and only then switches to bootstrap mode:

| | |
|---|---|
| ANDI#$ef, OMR | : clear CE bit in OMR |
| NOP | : pipeline delay |
| NOP | : pipeline delay |
| NOP | : pipeline delay |
| PFLUSH | |
| MOVEI#$04, OMR | : bootstrap from Port A |
| NOP | : pipeline delay |
| JMP#0 | : jump to bootstrap ROM |

Notice that PFLUSH was fetched and executed in PRAM MODE. It could have appeared one cycle earlier in which case it would have been fetched in CACHE MODE but executed in PRAM MODE.

We claim:

1. An integrated circuit including:

a processor and a memory coupled by data and address buses, switch means for switching the memory between a first, standard, mode of operation in which a memory controller is operative and a second, cache, mode of operation in which a cache controller is operative, the cache controller including a memory area comprising a valid bits array, a bit of which is set when a valid word is stored in a respective memory address of the memory in standard mode, and means, in the cache controller, for reading the valid bits array and thereby determining, in the cache model whether a valid bit exists corresponding to an address on the address bus so that information loaded into the memory in standard mode can be used by the processor in cache mode.

2. An integrated circuit as claimed in claim 1, further including means for setting selected bits of the valid bits array when corresponding addresses of the memory are loaded with data in the standard mode of operation, whereby when the mode changes to cache mode, the data will remain in memory as valid data.

3. An integrated circuit as claimed in claim 1, further including reset means for resetting the valid bits array to flush the cache in a single operation.

4. An integrated circuit as claimed in claim 1, wherein said integrated circuit chip is a digital signal processor.

5. An integrated circuit as claimed in claim 4, wherein the memory comprises an instruction cache.

6. An integrated circuit as claimed in claim 1, wherein the switch means includes an operating mode register having a cache enable section, and a cache enable control line coupled to the memory.

7. An integrated circuit as claimed in claim 6, wherein the switch means includes a switch controlled by the cache enable control line to switch access to the memory between the address bus and the cache controller.

8. An integrated circuit as claimed in claim 1, wherein the cache controller is arranged to divide the memory into a predetermined number of sectors, each sector having a predetermined number of words, the cache controller having a memory sector accessing means including a tag register in which an address tag of each sector is stored, and means for comparing the sector addresses with an address on the address bus.

9. An integrated circuit as claimed in claim 8, further including hit/miss determination means for determining whether a sector hit/miss occurs and whether a word hit/miss occurs.

10. An integrated circuit as claimed in claim 9, further including a sector replacement unit for replacing a sector when a sector miss occurs.

11. An integrated circuit as claimed in claim 10, further including means for locking any of the sectors, thereby preventing replacement of the sectors by the sector replacement unit when a sector miss occurs.

\* \* \* \* \*